United States Patent
Bahr (10) Patent No.: US 8,873,572 B2
(45) Date of Patent: Oct. 28, 2014

(54) ASSOCIATION UPDATE MESSAGE AND METHOD FOR UPDATING ASSOCIATIONS IN A MESH NETWORK

(75) Inventor: Michael Bahr, München (DE)

(73) Assignee: Siemens Aktiengesellschaft, Munich (DE)

(*) Notice: Subject to any disclaimer, the term of this patent is extended or adjusted under 35 U.S.C. 154(b) by 299 days.

(21) Appl. No.: 13/384,085

(22) PCT Filed: Jul. 9, 2010

(86) PCT No.: PCT/EP2010/059864
§ 371 (c)(1),
(2), (4) Date: Jan. 13, 2012

(87) PCT Pub. No.: WO2011/006841
PCT Pub. Date: Jan. 20, 2011

(65) Prior Publication Data
US 2012/0106532 A1 May 3, 2012

(30) Foreign Application Priority Data
Jul. 13, 2009 (EP) ..................... 09009115

(51) Int. Cl.
*H04L 12/28* (2006.01)
(52) U.S. Cl.
USPC .......................... 370/406; 370/389
(58) Field of Classification Search
None
See application file for complete search history.

(56) References Cited

U.S. PATENT DOCUMENTS

| | | | | |
|---|---|---|---|---|
| 7,464,381 B1* | 12/2008 | Nickerson et al. | ............ | 719/311 |
| 7,483,989 B2* | 1/2009 | Williams et al. | ............... | 709/227 |
| 7,894,408 B2* | 2/2011 | Zeng et al. | ..................... | 370/338 |
| 2004/0156633 A1 | 8/2004 | Kaspit et al. | ..................... | 398/30 |
| 2006/0039371 A1* | 2/2006 | Castro et al. | .................. | 370/389 |
| 2008/0192677 A1 | 8/2008 | Abusch-magder et al. | ... | 370/328 |
| 2008/0317047 A1 | 12/2008 | Zeng et al. | ..................... | 370/401 |
| 2009/0119407 A1* | 5/2009 | Krishnan | ..................... | 709/228 |
| 2009/0232119 A1* | 9/2009 | Seok | ............................. | 370/338 |
| 2010/0246417 A1* | 9/2010 | Cheng et al. | .................. | 370/252 |
| 2011/0016227 A1* | 1/2011 | Feng et al. | ..................... | 709/245 |
| 2011/0110303 A1* | 5/2011 | Bahr | ............................. | 370/328 |
| 2012/0106532 A1 | 5/2012 | Bahr | ............................. | 370/338 |

FOREIGN PATENT DOCUMENTS

| | | | | |
|---|---|---|---|---|
| CN | 101127778 A | 2/2008 | ............. | H04L 12/56 |
| WO | 2006/029131 A2 | 3/2006 | ............. | H04W 40/22 |
| WO | 2011/006841 A1 | 1/2011 | ............. | H04L 12/56 |

OTHER PUBLICATIONS

International PCT Search Report and Written Opinion, PCT/EP2010/059864, 12 pages, Sep. 3, 2010.

(Continued)

Primary Examiner — Phirin Sam
(74) Attorney, Agent, or Firm — King & Spalding L.L.P.

(57) ABSTRACT

An association update message for mesh networks according to the IEEE 802.11s standard provides the ability to include a plurality of associations in an association update message and thus ensure simultaneous updating of a plurality of associations of representative nodes with respect to the proxy nodes (proxy mesh stations) thereof. A threatened inconsistency in an association update in conventional systems, which provides for only one transmission of an association update message per association update, is thereby eliminated. The proxy information field has an identification field with a plurality of identification fields. The identification fields advantageously allow variable structuring of the proxy information fields, that is, dependent on the information transmitted, which also provides the ability to prevent redundant information in the proxy information fields.

20 Claims, 2 Drawing Sheets (56) References Cited

OTHER PUBLICATIONS

Bahr, M., "Update on the Hybrid Wireless Mesh Protocol of IEEE 802.11s, Mobile Adhoc and Sensor Systems", IEEE International Conference; 6 pages, Oct. 1, 2007.

IEEE P802.11sTMd3.0, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications, Amendment 10: Mesh Networking; 240 pages, Mar. 31, 2009.

Bahr, M., "IEEE 802.11-09/857r0, Proxy Update Element Revision, Submission for IEEE 802.11s", XP02597231, Siemens AG, 11 pages, Jul. 15, 2009.

Chinese Office Action, Application No. 201080031543.X, 12 pages, Nov. 22, 2013.

\* cited by examiner

ASSOCIATION UPDATE MESSAGE AND METHOD FOR UPDATING ASSOCIATIONS IN A MESH NETWORK

CROSS-REFERENCE TO RELATED APPLICATIONS

This application is a U.S. National Stage Application of International Application No. PCT/EP2010/059864 filed Jul. 9, 2010, which designates the United States of America, and claims priority to EP Patent Application No. 09009115.8 filed Jul. 13, 2009. The contents of which are hereby incorporated by reference in their entirety.

TECHNICAL FIELD

The invention relates to a method for updating associations in a mesh network, in particular one conforming to the IEEE 802.11s standard.

BACKGROUND

The IEEE 802.11s standard, which is currently still in draft form, is a sub-specification of the IEEE 802.11 standard, which specifies an industry standard for wireless network communications. The objective of IEEE 802.11s is to create a specification for the setting up of what are referred to in the technical world as wireless mesh networks or mesh networks. A mesh network is able to build up and configure itself largely autonomously.

From the document IEEE P802.11s/D3.02: >>Draft Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications—Amendment 10: Mesh Networking<<, a so-called >>proxy protocol<< is known, this being described in section 11C.9.5 of the document cited.

In the context of the proxy protocol, two types of node are distinguished. A >>proxy<< is a node which is normally—but not necessarily—a component of the mesh network. Such a proxy permits, for example, the temporary inclusion of communication partners from outside the network, which are not themselves a component of the mesh network. Since proxies arise at the (logical) boundary areas of a mesh network, they may also be referred to as mesh boundary nodes.

A represented node is a node external to the network which is associated with a proxy in such a way that a temporary or permanent communication relationship can be set up, between the represented node and the proxy together with other nodes associated with the mesh network, without the represented node becoming a component of the mesh network.

In conjunction with the rules of the standard document cited above, the proxy protocol pursues the objective of distributing the temporary or permanent association of represented nodes to their respective proxies in the mesh network.

One message provided in the proxy protocol, a so-called proxy-update message, in what follows: an association update message; and a corresponding proxy-update confirmation message, in what follows: an association update confirmation message, provide the means for the distribution of association information in a mesh network. Association information here refers to items of information about the association of a represented node with a proxy.

The association update message known until now has disadvantages.

One important disadvantage of the association update message known until now consists in the fact that it does not provide a structured information transmission by which simultaneous updating of several associations of represented nodes in relation to their proxies would be permitted. Furthermore, the association update message known until now permits no updating of association information in respect of represented nodes which are associated with a proxy other than the proxy which is sending the association update message.

SUMMARY

According to various embodiments, means can be provided which permit a structured form of association update message by which the disadvantages known up until now are at least partially eliminated.

According to an embodiment, an association update message for a mesh network, in particular for a mesh network conforming to the IEEE 802.11s standard, the mesh network consisting of at least one proxy and of at least one node, each represented by a proxy, may be provided for updating association information maintained in at least one proxy, wherein, —contained in the association update message is at least one proxy information field, which incorporates a flag array, —the flag array contains a flag which determines whether an association defined in the proxy information field is to be deleted from the association information or added into it, —the flag array contains a flag which determines whether the proxy information field contains the specification of a proxy information live time.

According to a further embodiment, the flag array may contain a flag which determines whether the proxy information field contains the specification of a proxy. According to a further embodiment, the association update message may have a data field which contains an item of information about the number of proxy information fields contained in it. According to a further embodiment, the proxy information field may contain an address of a represented node. According to a further embodiment, the association update message may have a data field containing an originator's address. According to a further embodiment, one or more receivers may be specified in the association update message.

According to another embodiment, in a method for association updating in a mesh network, in particular conforming to the IEEE 802.11s standard, the mesh network consisting of a plurality of proxies and of a plurality of nodes each represented by a proxy, with the association update message being provided for updating association information maintained in at least one proxy, —contained in the association update message is at least one proxy information field, which incorporates a flag array, —the flag array contains a flag which determines whether an association defined in the proxy information field is to be deleted from the association information or added into it, —the flag array contains a flag which determines whether the proxy information field contains the specification of a proxy information live time.

According to a further embodiment of the method, the flag array may contain a flag which determines whether the proxy information field contains the specification of a proxy. According to a further embodiment of the method, an association update message can be sent in accordance as stated above with respect to the association update message. According to a further embodiment of the method, a proxy information field may contain associations of represented nodes with a proxy. According to a further embodiment of the method, the associations can be taken from an association table stored in a proxy.

BRIEF DESCRIPTION OF THE DRAWINGS

An exemplary embodiment with further advantages and forms of the invention is explained in more detail below by reference to the drawing.

This shows.

DETAILED DESCRIPTION

According to various embodiments, an association update message of the familiar generic type is provided for the purpose of updating association information, stored in at least one proxy, which contains at least one proxy information field.

The proxy information field incorporates a code array which comprises several codes—also known technically as >>flags<<. In detail, a first flag is provided in the flag array and, as appropriate, this determines or supplies details of whether an association defined in the proxy information field is to be deleted from or added into the association information. In addition to this, a further flag is provided in the flag array, this determining whether the proxy information field contains the specification of a proxy information live time. It is advantageous that the association update message according to various embodiments offers the option of providing several proxy information fields in one message, and thereby achieving the simultaneous updating of several associations of represented nodes in relation to their proxies. This eliminates a potential inconsistency with an association update using the prior art, which only provides for the sending of one association update message per association update. With association updating as practiced under the prior art, the simultaneous updating of several associations of represented nodes in relation to their proxies was not permitted. Before the application of the rules according to various embodiments, this could result in an inconsistency arising due to changes, for example because of a third association update message, sent from another transmitter between the arrival of a first association update message and the arrival of a second association update message in the receiver.

The proxy information field according to various embodiments incorporates a flag array comprising several flags. It is advantageous that the flags permit a structuring of the proxy information fields which is variable, i.e. dependent on the information transmitted, and which, apart from its minimal data volume requirement, also includes the possibility of avoiding redundant information in the proxy information fields.

According to an embodiment, a flag is provided in the flag array and, as appropriate, this determines or supplies details of whether the proxy information field contains the specification of a proxy. Such a measure leads advantageously to a further reduction in the data volume required in the proxy information fields.

Figure 1:
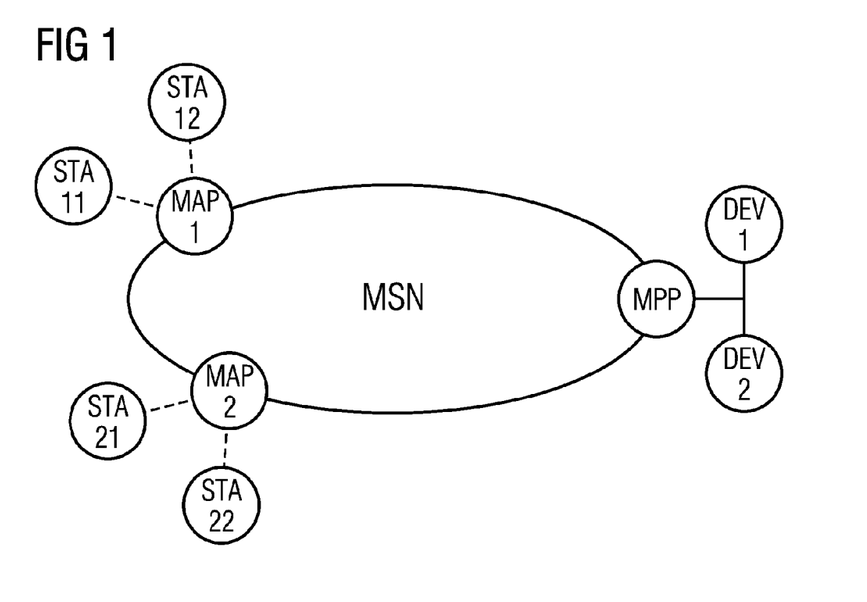
FIG. 1: an extract of an exemplary embodiment of a mesh network.

FIG. 1 shows an extract from an exemplary embodiment of a mesh network MSN, incorporating a first mesh boundary node MAP1, a second mesh boundary node MAP2 and a third mesh boundary node MPP. The mesh boundary nodes cited, MAP1, MAP2, MPP, are characterized by the fact that, apart from links to other mesh nodes—not shown—in the interior of the mesh network MSN, they also have links which do not belong to the mesh network MSN. In the present exemplary embodiment, the mesh boundary nodes MAP1, MAP2, MPP also incorporate a function as proxies MAP1, MAP2, MPP. A proxy MAP1, MAP2, MPP need not necessarily be a mesh boundary node MAP1, MAP2, MPP.

Links which do not belong to the mesh network MSN, more accurately referred to as >>associations<<, are maintained in particular to network-external nodes, namely to the nodes STA11, STA12, STA21, STA22, DEV1, DEV2 shown in the drawing. The last-named nodes STA11, STA12, STA21, STA22, DEV1, DEV2 are not direct components of the mesh network MSN and are therefore also referred to as >>external nodes<< STA11, STA12, STA21, STA22, DEV1, DEV2.

The network-external nodes STA11, STA12, STA21, STA22, DEV1, DEV2 are associated with a relevant proxy MAP1, MAP2, MPP and are therefore represented nodes STA11, STA12, STA21, STA22, DEV1, DEV2 of the proxy concerned, MAP1, MAP2, MPP.

The mesh network MSN illustrated in FIG. 1 has, in addition, a plurality of mesh nodes—not shown—in the interior of the mesh network, but these are not relevant for the description which follows.

The term mesh boundary node MAP1, MAP2, MPP is used to refer to a mesh node which, apart from links—not shown— to other mesh nodes within the mesh network MSN, also has links to external mesh nodes STA11, STA12, STA21, STA22, DEV1, DEV2. In the context of the rules of the IEEE 802.11s standard, mesh boundary nodes of this type can be both mesh access points and also mesh portals.

Conventional WLAN stations, or even user nodes, can link to the mesh access points mentioned in order to communicate via the mesh network MSN. For the last-mentioned mesh portals, links to other networks, such as for example a wire-based Ethernet—not shown—can also be maintained.

Conceptually, mesh access points and mesh portals can be handled in the same way as in the present exemplary embodiment. However, they are distinguished in the way that they obtain items of information about nodes external to the mesh network MSN, which can be reached through them. The topology and the possible number of external nodes which can be reached through them can also be different.

Figure 6:
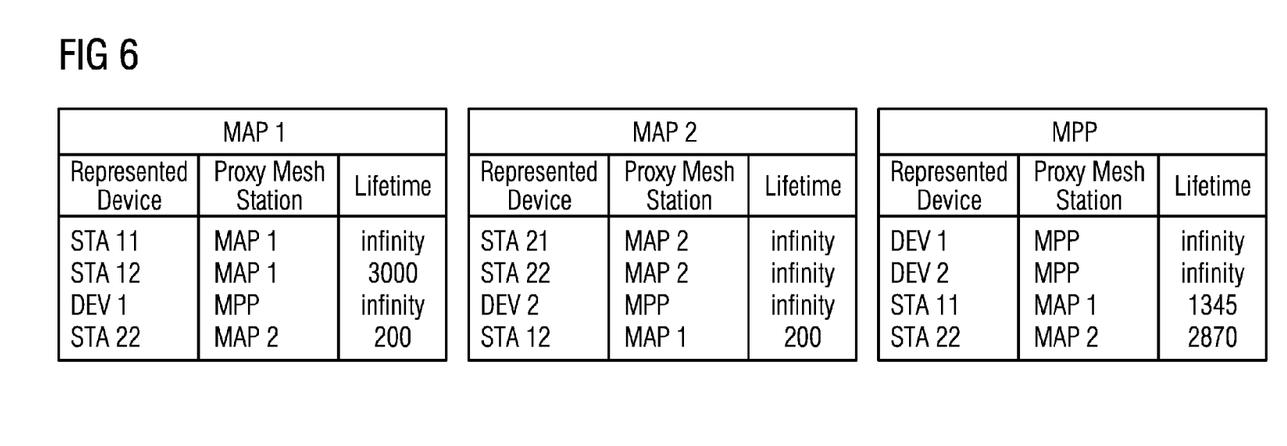
FIG. 6: various association tables.

As a prelude to a detailed explanation of FIG. 6, it is appropriate to say first that in the context of the exemplary embodiment >>association tables<< are defined in such a way that they contain items of information about associations between proxies MAP1, MAP2, MPP and the relevant represented nodes STA11, STA12, STA21, STA22, DEV1, DEV2. In the case of such an association, the mesh boundary nodes MAP1, MAP2, MPP act as proxies (>>proxy mesh stations<<) for the represented nodes (>>represented stations<< or >>proxied stations<<) STA11, STA12, STA21, STA22, DEV1, DEV2.

An entry in an association table specifies the proxy MAP1, MAP2, MPP via which a particular represented node STA11, STA12, STA21, STA22, DEV1, DEV2 can be reached from within the mesh network MSN.

Defined below as an association update message is a message with the help of which associations of represented nodes to proxies in the mesh network can be declared. The structure of this association update message is discussed in more detail below.

Figure 2:
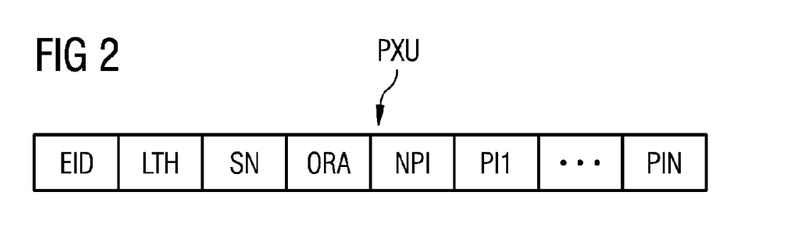
FIG. 2: a schematic diagram of a structure for an association update message.

FIG. 2 shows the structure of an association update message PXU (>>proxy update message<<) according to an embodiment. The association update message PXU here contains the following data fields, in a sequence as shown from left to right in FIG. 2:

An element identification number EID serves to identify the message as an association update message PXU. The element identification number EID is a specific data field defined in the IEEE 802.11s standard. The data field which contains the element identification number EID will preferably have a length of one octet.

A length specification LTH (>>length<<) defines the length of the association update message PXU. This length specification is also a specific data field defined in the IEEE 802.11s standard. The data field which contains the length specification LTH will preferably have a length of one octet.

A sequence number SN (>>PXU sequence number<<) contains an identifier for an association update message PXU which is unique, including within a sequence or series over time. The data field which contains the sequence number SN will preferably have a length of one octet.

An originator address field ORA (>>PXU originator MAC address<<), to which is assigned an address, preferably a MAC address, of the originator or sender, as applicable, of the association update message PXU. Usually, but not necessarily, the originator of an association update message PXU is a proxy. The data field which contains the originator address ORA will preferably have a length of one octet.

A data field specifying the number of proxy information fields NPI (>>number of proxy information<<). The number of proxy information fields NPI is specified numerically in this NPI data field. The data field which specifies the number of proxy information fields NPI will preferably have a length of one octet.

Following this there is one or a plurality of proxy information fields PI1, ..., PIN the number of which is specified in the data field explained above for specifying the number of proxy information fields, NPI. Each proxy information field PI1, ..., PIN will preferably have a length of 7, 11, 13 or 17 octets.

The fields named above are shown in the drawing in a sequence from left to right. It goes without saying that a different arrangement with an alternative sequence of the data fields named above is also conceivable.

Figure 3:
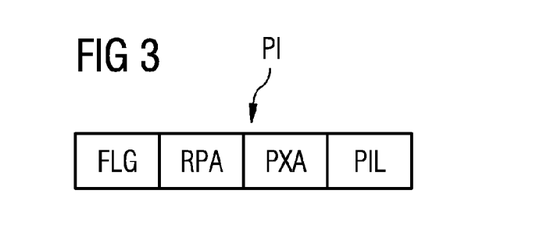
FIG. 3: a schematic diagram of a structure for a proxy information field.

For the purpose of explaining the structure of a proxy information field, refer to the diagram in FIG. 3.

FIG. 3 shows by way of example a proxy information field PI (>>proxy information<<) consisting of a flag array FLG (>>flag<<), a field RPA for specifying a represented address (>>represented MAC address<<), a field PXA for specifying a proxy address (>>proxy MAC address<<) together with a field for specifying the proxy information validity period PIL (>>proxy information live time<<).

The flag array FLG contains a plurality of flags (>>control flags<<), which will be explained in more detail by reference to FIG. 4. The flag array FLG will preferably have a length of one octet.

The field RPA for specifying the represented address contains an address of a represented node, that is for example the MAC address of an external mesh node STA11, STA12, STA21, STA22, DEV1, DEV2 as shown in FIG. 1. The field RPA contains, for example, the address of an external node which is >>represented<<, i.e. is administered in respect of its association, by a proxy. In the example of the arrangement shown in FIG. 1, the represented node STA11 is represented by the proxy MAP1. The field RPA for identifying the represented address will preferably have a length of six octets.

The field PXA for specifying the proxy address contains the address of the proxy for the node with the represented address from the field RPA. The field PXA for specifying the proxy address preferably has a length of zero or six octets. A length of zero, implying an absence of the field PXA, occurs, as explained further below, if the originator of the association update message PXU specified in the originator address field ORA agrees with the proxy which is to be updated in the proxy information field PI. In such a case, any specification of the proxy address PXA in the proxy information field PI would be redundant and thus unnecessary. Instead, when the flag SPX is appropriately set, the address of the originator of the association update message PXU is used in determining the address of the proxy which is to be updated.

The field PIL for specifying a proxy information live time defines a period of time within which the proxy information communicated by the proxy information field PI is deemed to be valid. The field PIL for specifying the proxy information live time will preferably have a length of zero or four octets.

The above-named fields are shown in the drawing in a sequence from left to right. It goes without saying that a different arrangement with an alternative sequence of the data fields named above is also conceivable.

Figure 4:
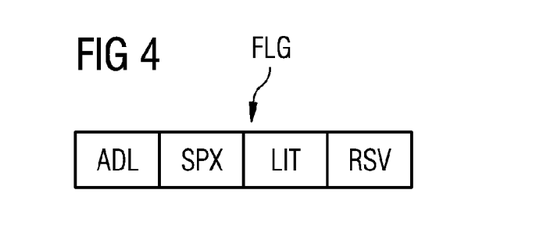
FIG. 4: a schematic diagram of a structure for a flag array.

FIG. 4 shows a structure for the flag array FLG shown in FIG. 3. The flag array FLG consists of a first flag ADL with a preferred length of one bit, a second flag SPX with a preferred length of one bit, a third flag LIT with a preferred length of one bit together with the flag array RSV with a preferred length of five bits.

The binary value of the first flag ADL (>>add/delete<<) determines whether an item of association information which belongs with it is to be added in or deleted. Adding in is indicated by a binary value of 0, deletion by a binary value of 1. The item of association information quoted will, in the case of an addition, be added to the association information of the receiver; in the case that a deletion is specified it will be deleted from the association information of the receiver.

In accordance with an alternative form of embodiment, the encoding of this first flag ADL in the contrary way is also conceivable, so that an addition is indicated by a binary value of 1, deletion on the other hand by a binary value of 0.

The second flag SPX (>>source proxy<<) shows the presence of the field PXA in the proxy information field PI. If the originator specified in the originator address field ORA of the association update message PXU agrees with the proxy which is to be updated, in the proxy information field PI, the specification of a proxy address PXA in the proxy information field PI would be redundant, and thus unnecessary. A binary value of 1 for the second flag SPX indicates that, because of this redundancy, no field is provided in the proxy information field PI of the association update message PXU in which to specify a proxy address PXA. In the contrary case, with a value 0, the field for the specification of the proxy address PXA contains a MAC address for the proxy. At the receiving end, the second flag SPX is evaluated in such a way that if its value is 1 the originator address specified in the originator address field ORA of the association update message PXU is used as the proxy address for the association, in the proxy information field PI of the association update message PXU, which is to be updated.

In accordance with an alternative form of embodiment, the encoding of this second flag SPX in the contrary way is also conceivable, so that the second flag SPX with a value of 0 indicates that no field is provided for the specification of a proxy address PXA in the proxy information field PI of the association update message PXU, and correspondingly, with a value of 1, that a field is provided for the specification of a proxy address PXA in the proxy information field PI of the association update message PXU and that this field contains a MAC address of the proxy node.

The use of the second flag SPX (>>source proxy<<) according to various embodiments achieves in an advantageous way the ability to send from proxies MAP1, MAP2, MPP all the possible items of association information, that is both such items of association information for which the proxies MAP1, MAP2, MPP sending the association update message PXU are also proxies MAP1, MAP2, MPP for the represented nodes STA11, STA12, STA21, STA22, DEV1, DEV2 concerned and also items of association information for which the proxy MAP1, MAP2, MPP sending the proxy update message PXU is not a proxy MAP1, MAP2, MPP for the represented nodes STA11, STA12, STA21, STA22, DEV1, DEV2 concerned but, for example, only stores this association information for other proxies MAP1, MAP2, MPP.

Furthermore, the use of the second flag SPX (>>source proxy<<) according to various embodiments achieves in an advantageous way the ability to specify the items of association information communicated in the relevant proxy information field PI1, . . . , PIN in any required sequence within an individual association update message PXU.

The third flag LIT (>>proxy information live time<<) shows, by a value of 1, that a field PIL is provided in a relevant proxy information field PI1, . . . , PIN for the specification of the proxy information live time. In the contrary case, when the value is 0, the field PIL is missing from this particular proxy information field PI1, . . . , PIN.

In accordance with an alternative form of embodiment, the encoding of this third flag LIT in the contrary way is also conceivable, so that a third flag LIT with a value of 0 indicates that a field PIL is provided for specifying the proxy information live time in the proxy information field concerned PI1, . . . , PIN and, correspondingly, with a value of 1 that this field PIL is missing in the proxy information field PI1, . . . , PIN concerned.

If the deletion of an item of association information is to be specified by the flag ADL (>>add/delete<<), the field PIL for specifying a proxy information live time does not need to be inserted in the proxy information field PI1. In such a case, it is advantageous to avoid unnecessary length in the association update message PXU. In particular, the specification of a proxy information live time is unnecessary if the association information corresponding to a proxy information field is to be deleted. For the receiver of an association update message PXU, the absence of a proxy information live time, in a proxy information field PI1, . . . , PIN in which the flag ADL specifies the addition in of the association information, means that it must itself define the proxy information live time.

If the addition in of an item of association information is to be specified by the flag ADL (>>add/delete<<), where the association contains a proxy information live time, this is inserted into field PIL, for specifying a proxy information live time, in the proxy information field PI1. If there is already a proxy information live time entered at the proxy MAP1, MAP2, MPP, which receives the association update message PXU, this will be overwritten by the proxy information live time contained in the field PIL if this value is higher than the value for the proxy information live time stored in the proxy MAP1, MAP2, MPP. If there is already a proxy information live time entered at the proxy MAP1, MAP2, MPP, which receives the association update message PXU, this will not be overwritten by the proxy information live time contained in the field PIL if this value is less than the value for the proxy information live time stored in the proxy MAP1, MAP2, MPP.

The flag RSV (>>reserved<<) contains, for example, codes which are provided for future or other types of applications and which are of no further concern in connection with this exemplary embodiment.

An association, making use of the association update message according to various embodiments, is explained below with reference to FIGS. 1, 5 and 6. Here, the starting point is a mesh network as shown in FIG. 1. The external network nodes STA11, STA12, STA21, STA22, DEV1, DEV2 are each assigned as represented nodes to a proxy MAP1, MAP2, MPP.

The proxies MAP1, MAP2, MPP store items of association information in each case in association tables, which are shown in this sequence from left to right in FIG. 6.

In a first association table, shown on the extreme left in the drawing, are recorded the items of association information stored at a first proxy MAP1.

A first represented node STA11 (>>represented device<<) is associated with the first proxy MAP1. The association is labeled with a proxy information live time of unlimited (>>infinity<<), that is to say the association of the first represented node STA11 with the first proxy MAP1 has no time limit.

A second represented node STA12 is also associated with the first proxy MAP1. The association of the second represented node STA12 with the first proxy MAP1 is labeled with a proxy information live time of 3000, that is to say the association of the second represented node STA12 with the first proxy MAP1 is limited to a duration of 3000 seconds. The proxy information live time can also be labeled as unlimited (>>infinity<<). However, on the basis of an internal decision-making routine in the first proxy MAP1, a proxy information live time with a high value of 3000 has been entered, so that the association of the second represented node STA12 at the third proxy MPP expires after this time value. In this way, the first proxy MAP1 does not need to send a new association update message in order to delete the association of the second represented node STA12 at the third proxy MPP.

A third represented node DEV1 is associated with a third proxy MPP. The association of the third represented node DEV1 with the third proxy MPP is not time-limited. The association table entry for the third represented node DEV1 shows that any particular proxy MAP1, MAP2, MPP does not only store items of association information for those represented nodes which are associated with the proxy MAP1 which maintains the association table, but in addition also associations of represented nodes, in this case the third and a fourth represented node DEV1, STA22, each of which is associated with other proxies MPP, MAP2.

The fourth represented node STA22 is associated with a second proxy MAP2. The association is labeled with a proxy information live time of 200, that is to say the association of the fourth represented node STA22 with the second proxy MAP2 is limited to a time duration of 200 seconds.

In a second association table, shown in the middle of the drawing, are recorded items of association information stored at the second proxy MAP2.

A fifth represented node STA21 is associated with the second proxy MAP2. The association of the fifth represented node STA21 with the second proxy MAP2 has no time limit.

The fourth represented node STA22 is associated with the second proxy MAP2. However, in the second association table the association of the fourth represented node STA22 with the first proxy MAP1 is entered as having no time limit, unlike the corresponding entry in the first association table.

A sixth represented node DEV2 is associated with the third proxy MPP. The association of the sixth represented node DEV2 with the third proxy MPP has no time limit.

The second represented node STA12 is associated with the first proxy MAP1. However, in the second association table the association of the second represented node STA12 with the first proxy MAP1 is entered as having a time duration limited to 200 seconds, unlike the corresponding entry in the first association table.

In a third association table, shown on the extreme right of the drawing, are recorded items of association information stored at the third proxy MPP.

The third represented node DEV1 is associated with the third proxy MPP. The association of the third represented node DEV1 with the third proxy MPP is entered as having no time limit, in agreement with the information entered in the first association table.

The sixth represented node DEV2 is associated with the third proxy MPP. The association of the sixth represented node DEV2 with the third proxy MPP is entered as having no time limit, in agreement with the information entered in the second association table.

The first represented node STA11 is associated with the first proxy MAP1. However, in the third association table the association of the first represented node STA11 with the first proxy MAP1 is entered as having a time duration limited to 1345 seconds, unlike the corresponding entry in the first association table.

The fourth represented node STA22 is associated with the second proxy MAP2. However, in the third association table the association of the fourth represented node STA22 with the second proxy MAP2 is entered as having a time duration limited to 2870 seconds, unlike the corresponding entry in the first association table.

Referring to the diagram in FIG. 1, it is assumed below that a previously existing association of the first represented node STA11 is deleted from the first proxy MAP1. Because of this event, a complete association update message, based on the items of association information stored in the first proxy MAP1 is sent from the first proxy MAP1 to the third proxy MPP.

Figure 5:
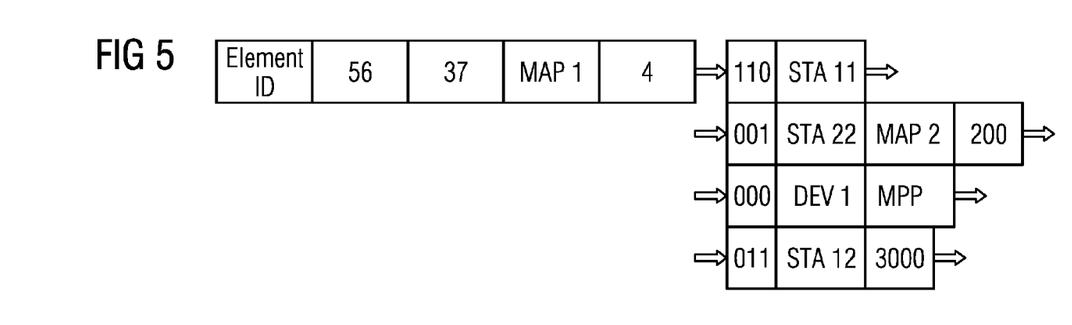
FIG. 5: various proxy field information fields.

FIG. 5 shows an associated association update message making use of the means according to various embodiments. For the sake of improving readability, the four proxy information fields are shown in rows underneath each other. Accordingly, the arrows which are shown in FIG. 5 indicate that in reality the transmission is continuous and sequential.

As shown in the structure in FIG. 2, the association update message begins with the information field EID, in which is entered an element ID which is of no further interest. Following on from this information field is a length specification LTH, for which a value of 56 has been entered here, cf. FIG. 5. After this information field comes an information field SN for the specification of a sequence number, for which a value of 37 has been entered here, cf. FIG. 5.

In conformity with the structure for an association message, cf. FIG. 2, there now follows an originator address field ORA for the specification of the originator or sender, as applicable, of the association update message. Because the association update message has been called for because of a change in an association in the first proxy MAP1, the aforementioned first proxy MAP1 is the originator of the association update message, cf. FIG. 5. Instead of an identifier or mnemonic being entered there for the first proxy MAP1, in a real implementation the MAC address of the proxy MAP1 would preferably be entered there.

In conformity with the structure for an association message, cf. FIG. 2, there now follows a data field NPI which specifies the number of proxy information fields, for which a value 4 has been entered here, cf. FIG. 5. The number NPI of the data fields corresponds to the number of associations to be updated, four, where each association is defined in a separate proxy information field. The number of associations to be updated, four, agrees in turn with the number of association entries in the association table provided for the first proxy MAP1, cf. the extreme left table in FIG. 6.

The first proxy information field, shown right at the top in the drawing, concerns an association update relating to the represented node STA11.

The first proxy information field begins with a flag array FLG with a bit sequence >>110<< of flags which encode in sequence the first flag ADL, the second flag SPX and the third flag LIT. For the semantics of the individual flags, cf. the description for FIG. 2.

The first flag ADL (>>add/delete<<) has a binary value of 1 because it is intended to specify a deletion of the association information relating to the first represented node STA11, that is the represented node STA11 which is to be removed.

The second flag SPX (>>source proxy<<) has a binary value of 1, which indicates that the sender or originator, as applicable, of the association update message, in the present case the first proxy MAP1, agrees with the proxy which is actually to be specified in the first proxy information field but which, on grounds of redundancy, is not to be entered in the proxy information field.

The third flag LIT (>>proxy information live time<<) has a binary value of 0, which indicates that the field PIL for specifying the proxy information live time is omitted from this proxy information field. Because the association relating to the first represented node STA11 is to be deleted at the third proxy MPP, the receiver of the association update message, no provision is made for specifying the proxy information live time.

Corresponding to the encoding presented above, of the flag array FLG in the first proxy information field which specifies an association update relating to the represented node STA11, only one further data field is now required, apart from the flag array FLG, namely the data field RPA for specifying the represented address. For this, the value of the represented node STA11 is entered, cf. FIG. 5. The first proxy information field then has a length of 7 octets.

The second proxy information field, shown in the drawing on a second line underneath the first proxy information field, concerns an association update relating to the fourth represented node STA22.

The second proxy information field begins with a flag array FLG with a bit sequence >>001<< of flags which encode in sequence the first flag ADL, the second flag SPX and the third flag LIT. For the semantics of the individual flags, cf. the description for FIG. 2.

The first flag ADL (>>add/delete<<) has a binary value of 0, because it is to specify an addition in of the association information relating to the fourth represented node STA22.

The second flag SPX (>>source proxy<<) has a binary value of 0, which indicates that the sender or originator, as applicable, of the association update message, in the present case the first proxy MAP1, does not agree with the second proxy MAP2, which must now instead be specified in the second proxy information field, and which according to the association table for the first proxy MAP1 is the proxy MAP2 for the fourth represented node STA22, cf. the extreme left table in FIG. 6.

The third flag LIT (>>proxy information live time<<) has a binary value of 1, which indicates that the field PIL for specifying the proxy information live time is present in this proxy information field. Indeed, for the fourth represented node STA22 according to the association table provided for the first proxy MAP1 its association is labeled with a proxy information live time of 200, cf. extreme left table in FIG. 6. The specification of a proxy information live time in the proxy information field is therefore required.

Corresponding to the encoding presented above, of the flag array FLG in the second proxy information field which specifies an association update relating to the represented node STA22, three further data fields are now still required, apart from the flag array FLG, namely the data field RPA for specifying the represented address, the data field PXA for specifying the proxy address and the data field PIL for specifying the proxy information live time. For these data fields RPA, PXA, PIL, the address of the fourth represented node STA22, the address of the second proxy node MAP2 and the value 200 for the proxy information live time for the fourth represented node STA22 are entered in this sequence, cf. FIG. 5. The second proxy information field then has a length of 17 octets.

The third proxy information field, in the drawing on a third line underneath the second proxy information field, concerns an association update relating to the third represented node DEV1.

The third proxy information field begins with a flag array FLG with a bit sequence >>000<< of flags which encode in sequence the first flag ADL, the second flag SPX and the third flag LIT. For the semantics of the individual flags, cf. the description for FIG. 2.

The first flag ADL (>>add/delete<<) has a binary value of 0, because it is to specify an addition in of the association information relating to the third represented node DEV1.

The second flag SPX (>>source proxy<<) has a binary value of 0, which indicates that the sender or originator, as applicable, of the association update message, in the present case the first proxy MAP1, does not agree with the third proxy MPP, which must now instead be specified in the third proxy information field, and which according to the association table for the first proxy MAP1 is the proxy MPP for the third represented node DEV1, cf. the extreme left table in FIG. 6.

The third flag LIT (>>proxy information live time<<) has a binary value of 0, which indicates that the field PIL for specifying the proxy information live time is omitted from this proxy information field. Indeed, for the third represented node DEV1 according to the association table provided for the first proxy MAP1 its association is labeled with a proxy information live time of unlimited (>>infinity<<), cf. extreme left table in FIG. 6. It is therefore not necessary to specify a proxy information live time in the proxy information field.

Corresponding to the encoding presented above, of the flag array FLG in the third proxy information field which specifies an association update relating to the represented node DEV1, two further data fields are now still required, apart from the flag array FLG, namely the data field RPA for specifying the represented address, the data field PXA for specifying the proxy address. For these data fields RPA, PXA, the address of the third represented node DEV1 and the address of the third proxy MPP are entered in this sequence, cf. FIG. 5. The third proxy information field then has a length of 13 octets.

Finally, the fourth proxy information field, in the drawing shown on the last line, underneath the third proxy information field, concerns an association update relating to the second represented node STA12.

The fourth proxy information field begins with a flag array FLG with a bit sequence >>011<< of flags which encode in sequence the first flag ADL, the second flag SPX and the third flag LIT. For the semantics of the individual flags, cf. the description for FIG. 2.

The first flag ADL (>>add/delete<<) has a binary value of 0, because it is to specify an addition in of the association information relating to the second represented node STA12.

The second flag SPX (>>source proxy<<) has a binary value of 1, which indicates that the sender or originator, as applicable, of the association update message, in the present case the first proxy MAP1, agrees with the proxy which is actually to be specified in the first proxy information field but which, on grounds of redundancy, is not entered in the proxy information field.

The third flag LIT (>>proxy information live time<<) has a binary value of 1, which indicates that the field PIL for specifying the proxy information live time is present in this proxy information field. Indeed, for the second represented node STA12 according to the association table provided for the first proxy MAP1 its association is labeled with a proxy information live time of 3000 seconds, cf. extreme left table in FIG. 6. The specification of a proxy information live time in the proxy information field is therefore required.

Corresponding to the encoding presented above, of the flag array FLG in the fourth proxy information field which specifies an association update relating to the second represented node STA12, two further data fields are now still required, apart from the flag array FLG, namely the data field RPA for specifying the represented address and the data field PIL for specifying the proxy information live time. For these data fields RPA, PIL, the address of the second represented node STA12 and the value 3000 for the proxy information live time for the second represented node STA12 are entered in this sequence, cf. FIG. 5. The fourth proxy information field then has a length of 11 octets.

The association update message shown in the example has the advantage that it can not only contain association updates for the proxy node which is the sender of the association update message, but also association updates for other proxies. With the prior art, until now only an association update for the proxy which is the sender of the association update message has been possible.

A further embodiment provides for the receiver or several receivers to be specified in the association update message PXU. In this way, the communication of an association update message PXU becomes independent of the way it is communicated. In the context of the rules of the IEEE 802.11s standard, an association update message PXU is transported as one of several >>information elements<< within a >>management frame<<. Such a management frame begins with a plurality of message header entries (>>header<<). Here, the transmission of the association update message PXU is provided for in so-called >>4-address management frames<<. This type of transmission implies that the association update message PXU is sent directly, by uni-cast, from one sender to one receiver, while an intermediate node which forwards this association update message PXU cannot evaluate the association updates contained in the association update message PXU. If now, in accordance with this development, the receiver is specified in the association update message PXU, this permits the use of a >>3-address management frame<<, which is provided solely for a direct transmission between two neighboring nodes. In this case, the receiver of the 3-address management frame receives the association update message PXU and evaluates its contents. If this evaluation shows that the evaluating node is not the receiver of the addressed association update message PXU, the management frame is forwarded to the next node towards the destination.

The invention claimed is:

1. A method for operating a mesh network consisting of at least one proxy and of at least one node, each represented by a proxy, the method comprising:
   transmitting an association update message; and
   updating association information maintained in the at least one proxy based on the association update message,
   wherein, contained in the association update message is at least one proxy information field, which incorporates a flag array,
   the flag array contains a first flag which determines whether an association defined in the proxy information field is to be deleted from the association information or added into it, and
   the flag array contains a second flag which determines whether the proxy information field contains the specification of a proxy information live time.

2. The method according to claim 1, wherein the flag array contains a third flag which determines whether the proxy information field contains the specification of a proxy.

3. The method according to claim 1, wherein, the association update message has a data field which contains an item of information about the number of proxy information fields contained in it.

4. The method according to claim 1, wherein the proxy information field contains an address of a represented node.

5. The method according to claim 1, wherein the association update message having a data field containing an originator's address.

6. The method according to claim 1, wherein one or more receivers being specified in the association update message.

7. A method for association updating in a mesh network the mesh network consisting of a plurality of proxies and of a plurality of nodes each represented by a proxy, with the association update message being provided for updating association information maintained in at least one proxy, wherein,
   contained in the association update message is at least one proxy information field, which incorporates a flag array,
   the flag array contains a first flag which determines whether an association defined in the proxy information field is to be deleted from the association information or added into it,
   the flag array contains a second flag which determines whether the proxy information field contains the specification of a proxy information live time.

8. The method according to claim 7, wherein the flag array contains a third flag which determines whether the proxy information field contains the specification of a proxy.

9. The method according to claim 7, wherein an association update message has a data field which contains an item of information about the number of proxy information fields contained in it.

10. The method according to claim 7, wherein a proxy information field contains associations of represented nodes with a proxy.

11. The method according to claim 10, wherein the associations are taken from an association table stored in a proxy.

12. The method according to claim 7, wherein the mesh network conforms to the IEEE 802.11s standard.

13. The method according to claim 7, wherein the proxy information field contains an address of a represented node.

14. The method according to claim 7, wherein the association update message having a data field containing an originator's address.

15. The method according to claim 7, wherein one or more receivers being specified in the association update message.

16. The method according to claim 1, wherein the mesh network conforms to the IEEE 802.11s standard.

17. A mesh network comprising at least one proxy and at least one node, each represented by a proxy, wherein the network is configured to use an association update message being provided for updating association information maintained in at least one proxy, wherein,
   contained in the association update message is at least one proxy information field, which incorporates a flag array,
   the flag array contains a first flag which determines whether an association defined in the proxy information field is to be deleted from the association information or added into it,
   the flag array contains a second flag which determines whether the proxy information field contains the specification of a proxy information live time.

18. The mesh network according to claim 17, wherein the flag array contains a third flag which determines whether the proxy information field contains the specification of a proxy.

19. The mesh network according to claim 17, wherein the association update message has a data field which contains an item of information about the number of proxy information fields contained in it.

20. The mesh network according to claim 17, wherein the proxy information field contains an address of a represented node.

* * * * *